United States Patent
Karaki

(10) Patent No.: US 7,693,930 B2
(45) Date of Patent: Apr. 6, 2010

(54) ASYNCHRONOUS FULL ADDER, ASYNCHRONOUS MICROPROCESSOR AND ELECTRONIC APPARATUS

(75) Inventor: Nobuo Karaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1449 days.

(21) Appl. No.: 11/060,764

(22) Filed: Feb. 18, 2005

(65) Prior Publication Data
US 2005/0216546 A1  Sep. 29, 2005

(30) Foreign Application Priority Data
Mar. 24, 2004 (JP) .............. 2004-086465
Sep. 24, 2004 (JP) .............. 2004-277309

(51) Int. Cl.
*G06F 7/50* (2006.01)

(52) U.S. Cl. .................................... 708/704
(58) Field of Classification Search .......... 708/700, 708/702, 704
See application file for complete search history.

(56) References Cited

U.S. PATENT DOCUMENTS

| 3,290,511 | A | 12/1966 | Sims |
| 5,208,490 | A | 5/1993 | Yetter |
| 5,329,176 | A | 7/1994 | Miller, Jr. et al. |
| 5,392,423 | A | 2/1995 | Yetter |
| 5,636,157 | A * | 6/1997 | Hesson et al. ............ 708/714 |
| 5,752,070 | A | 5/1998 | Martin et al. |
| 6,031,390 | A * | 2/2000 | Fant et al. ............... 326/36 |
| 6,152,613 | A | 11/2000 | Martin et al. |
| 6,466,960 | B1 * | 10/2002 | Winters ................ 708/671 |
| 6,785,703 | B2 * | 8/2004 | Bradley et al. .......... 708/702 |

FOREIGN PATENT DOCUMENTS

| JP | A 5-233214 | 9/1993 |
| JP | A 6-152386 | 5/1994 |
| JP | A 6-282415 | 10/1994 |

OTHER PUBLICATIONS

Renaudin et al.,"The Design of Fast Asynchronous Adder Structures and Their Implementation Using D.C.V.S. Logic", Circuits and Systems, 1994. ISCAS '94., 1994 IEEE International Symposium, pp. 291-294.*

* cited by examiner

*Primary Examiner*—Chuong D Ngo
(74) *Attorney, Agent, or Firm*—Oliff & Berridge, PLC

(57) ABSTRACT

An asynchronous adder permits asynchronous design in which dual-rail encoding is employed, not only for a control part but also for a datapath part including an ALU. An asynchronous adder of an exemplary embodiment includes a combinational circuit to perform full addition with, as an input value, an addend X, an augend Y and a carry-in $C_{in}$ that are dual-rail encoded, and to output a sum output Z and a carry output $C_{out}$ that are dual-rail encoded as an output value.

6 Claims, 7 Drawing Sheets

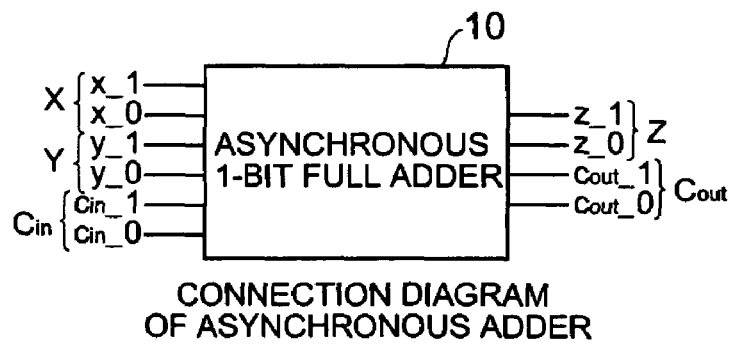
CONNECTION DIAGRAM
OF ASYNCHRONOUS ADDER
FIG. 1
| X | x_1 | x_0 | x1 | x0 |
|---|---|---|---|---|
| "Null" | 0 | 0 | 0 | 0 |
| "0" | 0 | 1 | 0 | 1 |
| "1" | 1 | 0 | 1 | 0 |
Dual-Rail Encoding Scheme
FIG. 2
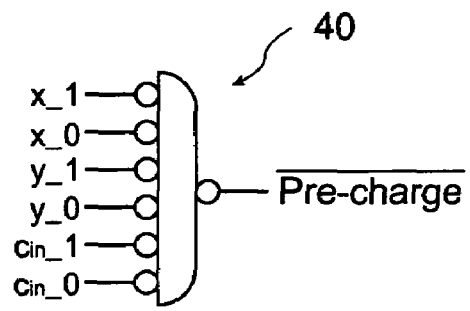
PRE-CHARGE SIGNAL GENERATOR
FIG. 3

| INPUT | | | | | | OUTPUT | | | |
|---|---|---|---|---|---|---|---|---|---|
| x1 | x0 | y1 | y0 | Cin1 | Cin0 | z1 | z0 | Cout1 | Cout0 |
|  | X |  | X |  | X |  | X |  | X |
| X |  |  | X |  | X | X |  |  | X |
|  | X | X |  |  | X | X |  |  | X |
| X |  | X |  |  | X |  | X | X |  |
|  | X |  | X | X |  | X |  |  | X |
| X |  |  | X | X |  |  | X | X |  |
|  | X | X |  | X |  |  | X | X |  |
| X |  | X |  | X |  | X |  | X |  |

TRUTH TABLE

CONNECTION DIAGRAM
OF DUAL-RAIL DECODER

CIRCUIT DIAGRAM OF DUAL-RAIL DECODER

HANDSHAKING AMONG PROCESSES

100 :COMBINATIONAL CIRCUIT

CMOS LOGIC CIRCUIT (z1 OUTPUT)

ASYNCHRONOUS FULL ADDER, ASYNCHRONOUS MICROPROCESSOR AND ELECTRONIC APPARATUS

BACKGROUND

Exemplary embodiments of the present invention relate to an asynchronous full adder, and more particularly to an enhanced technique thereof to employ a dual-rail scheme for the datapath, including arithmetic-logic unit (ALU), of asynchronous microprocessors.

An ALU of a microprocessor, that performs arithmetic and logic operation, such as addition, subtraction, logical OR and AND, includes a full adder, an accumulator register, a flag resister, etc. ALUs are designed in optimum schemes that are employed with regard to the applications, performance, power consumption, chip area and other factors. For example, the related art includes a ripple-carry adder and a carry-lookahead adder. The ripple-carry adder is slightly inferior to the carry-lookahead adder in operation speed. However, the ripple-carry adder leads to a smaller chip area, and therefore is most typically used in microprocessor design. The datapath circuit including an adder is driven by global clock in synchronous design. Therefore, in the case of that the delay of a ripple-carry chain is sufficiently small against the clock period, the operation speed of the microprocessor solely depends on the delay of the critical path. Hence, the ripple-carry adder, which leads to a smaller chip area, has an advantage over carry-lookahead adders.

Related art adders are designed as a part of a datapath that is driven by a global clock, so that addition under the worst condition shall be completed within a cycle or cycles of the global clock, satisfying the setup time and hold time against, for example, the rising edge of the global clock signal. For example, in the case of an 8-bit ripple-carry adder, which is constituted by connecting eight 1-bit full adders, the longest delay following the 8-stage carry chain is subject to a problem in timing design. Eight times the delay of the 1-bit full adder may roughly be regarded as the delay of the 8-bit ripple-carry adder. Preferably the transistors are sized to reduce the carry chain delay, and then the nominal delay is determined according to the timing simulation, such as SPICE simulation. Usually, iteration of sizing across circuit and physical design for speed/area/power trade-offs is unavoidable and time-consuming.

Since, in synchronous design or worst-case design, the longest delay of 8-stage carry chain is assumed to be constant in the context that it shall always be accommodated in the clock period, no matter how large the transistors are sized and what type of scheme is adopted, the delay of computation is independent on the addends and result. So far, as mentioned above, synchronous design, which is used in the related art, involves the foregoing problem across the circuit and physical design process, as well as the clock-skew problem as described in U.S. Pat. No. 3,290,511.

SUMMARY

In contrast, the control part of asynchronous designs is to be based on the dual-rail encoding scheme, while the datapath is designed preferably based on the bundle-data single-rail scheme. In this case, the datapath, including an adder, that has been prepared for a synchronous design can be reused for the asynchronous design, taking the advantages of less labor/time and small chip area. However, it causes another problem for designers that the bundle-data single-rail designs shall be verified by timing simulation using the bounded-delay model, which is originally not suitable for asynchronous design, because they might want to be freed from any timing assumptions in the realm of asynchronous design.

In asynchronous design by communicating sequential processes (CSP), datapath design based on average case scheme is preferable, and the application thereof to the thin-film-transistor (TFT) technology and deep-submicron technology is expected. As disclosed in U.S. Pat. Nos. 5,752,070 and 6,152,613, according to the inventions by a group at California Institute of Technology (Caltech), an ALU of an asynchronous microprocessor employs the dual-rail scheme and "kill", "propagate" and "generate" (KPG) signals to convey the completion of computation at a stage to the next stage, and thereby leads to a reduced or the minimal processing time, i.e., the average case delay. However, the three signals of KPG are single-rail. Therefore, the condition for the stable operation is that the KPG signals get stable at the time when the carry output unit receives dual-rail encoded signals from the carry input unit. The KPG unit at each stage generates KPG signals based on the value of two addends input to the ALU. Only the superior system of the ALU can arrange for the KPG signals to be generated according to all the addends prior to the time when dual-rail signals from the control arrive. Thus, the related art has not completely accomplished a dual-rail scheme.

Accordingly, in order to address or solve the above, exemplary embodiments of the present invention address or realize asynchronous design in which dual-rail encoding is totally employed, not only for the control, but also for the datapath including ALU. Furthermore, exemplary embodiments of the present invention reduce labor and time for the datapath design, enhance the portability of IP of asynchronous processes, and absorb deviation in switching delay due to deviation in threshold voltage of transistors so as to enhance the robustness. Also, exemplary embodiments of the present invention address or achieve higher performance with less delay in average case design, and address or solve the clock-skew problem in synchronous design.

In order to address or solve the above, an asynchronous adder of exemplary embodiments of the present invention includes a combinational circuit to perform full addition with two addends, and a carry-in that are dual-rail encoded, and to output a sum and a carry output that are dual-rail encoded. This configuration addresses or realizes asynchronous designs in which dual-rail encoding is employed, not only for the control part, but also for the datapath part including the ALU.

The asynchronous adder of exemplary embodiments of the present invention preferably further include a detection device to detect Null of the input values. Furthermore, the combinational circuit preferably performs full addition, based on the input values if values other than Null are input.

The combinational circuit preferably includes: an N-ch MOSFET network including a plurality of columns of cascaded N-ch MOSFETs between a node and ground; a precharge device to precharge the node if the detection device detects Null of input values; a connecting device to connect input signals to gate terminals of the N-ch MOSFETs based on a truth table which specifies a combinational logic required to compute an output signal from input signals; and a buffer to drive the node to a voltage of the output value. In addition, drain terminals of the N-ch MOSFETs at uppermost stages of all columns are preferably connected to the node, and source terminals of the N-ch MOSFETs at lowermost stages of all columns are preferably connected to the ground. Since the input values are delimited by Nulls, the node shall be precharged at the timing when Nulls are detected.

The asynchronous adder of exemplary embodiments of the present invention may further include a device to, if values other than Null are input, control so that the precharge device does not precharge the node during a period when all N-ch MOSFETs of any column of the N-ch MOSFET network are ON. This configuration avoids a wasteful current flowing through the precharge device and the N-ch MOSFET network.

The asynchronous adder of exemplary embodiments of the present invention may further include dual-rail decoders that decode dual-rail encoded input values.

The asynchronous microprocessor of exemplary embodiments of the present invention includes the asynchronous adder of exemplary embodiments of the present invention. An asynchronous microprocessor can be achieved, in which dual-rail encoding scheme is totally employed, not only for the control part, but also for the datapath part including the ALU.

The electronic apparatus of exemplary embodiments of the present invention includes the asynchronous microprocessor of exemplary embodiments of the present invention. A high performance electronic apparatus utilizing the advantageous features of the asynchronous microprocessor of exemplary embodiments of the present invention can be provided.

BRIEF DESCRIPTION OF THE DRAWINGS

FIG. 1 is a schematic of an asynchronous adder of a first exemplary embodiment;

FIG. 2 is a schematic of a dual-rail encoding scheme;

FIG. 3 is a schematic of a precharge signal generator;

DETAILED DESCRIPTION OF EMBODIMENTS

An asynchronous adder of the present exemplary embodiment includes a combinational circuit. The combinational circuit performs full addition with, as input values, addends X, Y and a carry-in $C_{in}$ in that are dual-rail encoded, and outputs a sum Z and a carry $C_{out}$ that are dual-rail encoded. This configuration addresses or realizes asynchronous designs in which dual-rail encoding is employed, not only for the control part, but also for the datapath part including the ALU.

First Exemplary Embodiment

FIG. 1 is a schematic showing the input/output relationship of an asynchronous adder 10 of a first exemplary embodiment. The asynchronous adder 10 is a 1-bit full adder that receives the dual-rail encoded addends X, Y and carry-in $C_{in}$ to perform full addition, and outputs the dual-rail encoded sum Z and carry $C_{out}$. The addends X, Y and carry-in $C_{in}$ are encoded to $\{x\_1, x\_0\}$, $\{y\_1, y\_0\}$, $\{c\ in\_1, c\ in\_0\}$ according to the dual-rail encoding scheme. The sum Z and carry $C_{out}$ are also encoded to $\{z\_1, z\_0\}$ and $\{c\ out\_1, c\ out\_0\}$ respectively.

FIG. 2 is a table showing a dual-rail encoding scheme. According to FIG. 2, "0", "1" and "Null" are converted to $\{0, 1\}$, $\{1, 0\}$ and $\{0, 0\}$, respectively. The data "0" and "1" are fed to the asynchronous adder 10 while "Null" codes are interposed between the data "0" and "1" as delimiters.

Figure 6:
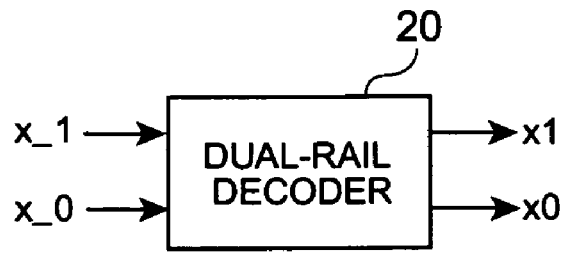
FIG. 6 is a schematic of a dual-rail decoder.
Figure 7:
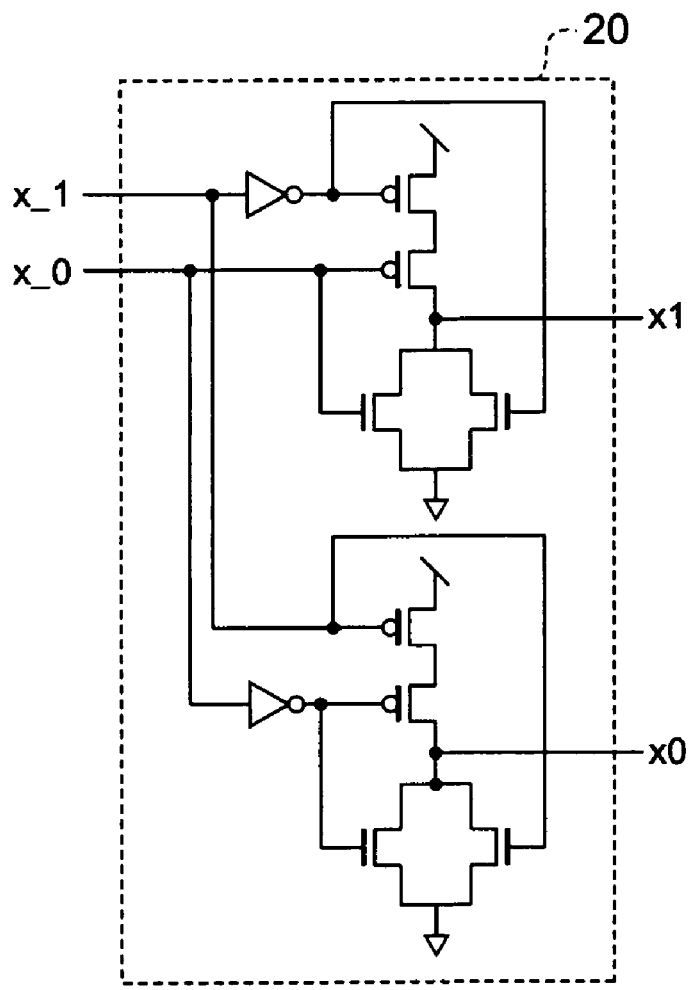
FIG. 7 is a schematic of the dual-rail decoder.

FIG. 6 is a schematic showing the input/output relationship of a dual-rail decoder 20. FIG. 7 is a schematic showing the specific circuit arrangement of the dual-rail decoder 20. $\{x\_1, x\_0\}$ is converted to $\{x1, x0\}$ by dual-rail decoding. The dual-rail decoding scheme converts $\{0, 0\}$, $\{0, 1\}$ and $\{1, 0\}$ to $\{0, 0\}$, $\{0,1\}$ and $\{1, 0\}$, respectively, as shown in FIG. 2. Since the input $\{x\_1, x\_0\}=\{1, 1\}$ is inhibited, the dual-rail decoder shown in FIG. 7 treats and converts it to "Null"=$\{0, 0\}$. However, if there is no chance for the inhibited value $\{1, 1\}$ to be input, the dual-rail decoder 20 may be only a buffer, such that x1=buff (x\_1) and x2=buff (x\_2).

FIG. 3 is a schematic showing a precharge signal generator, serving as a detection device to detect Null of the inputs values X, Y and $C_{in}$. If all dual-rail encoded inputs X, Y and $C_{in}$ are "Null", i.e., all of x1, x0, y1, y0, $c_{in}1$ and $c_{in}0$ are "0", the precharge signal generator 40 switches the logic level of a precharge_signal to Low. The precharge_signal gives timing of precharging an N-ch MOSFET network, described below. Just for conventions here, the symbol A_stands for the logical NOT of A, i.e., the low level is TRUE.

Given that the addends X, Y and carry-in $C_{in}$ are input to compute the sum Z and carry $C_{out}$, the following equations (1) and (2) are satisfied in 1-bit full addition.

$$Z = X \oplus Y \oplus C_{in} \quad (1)$$

$$C_{out} = X \cdot Y + Y \cdot C_{in} + C_{in} \cdot X \quad (2)$$

Figures 4, 5:
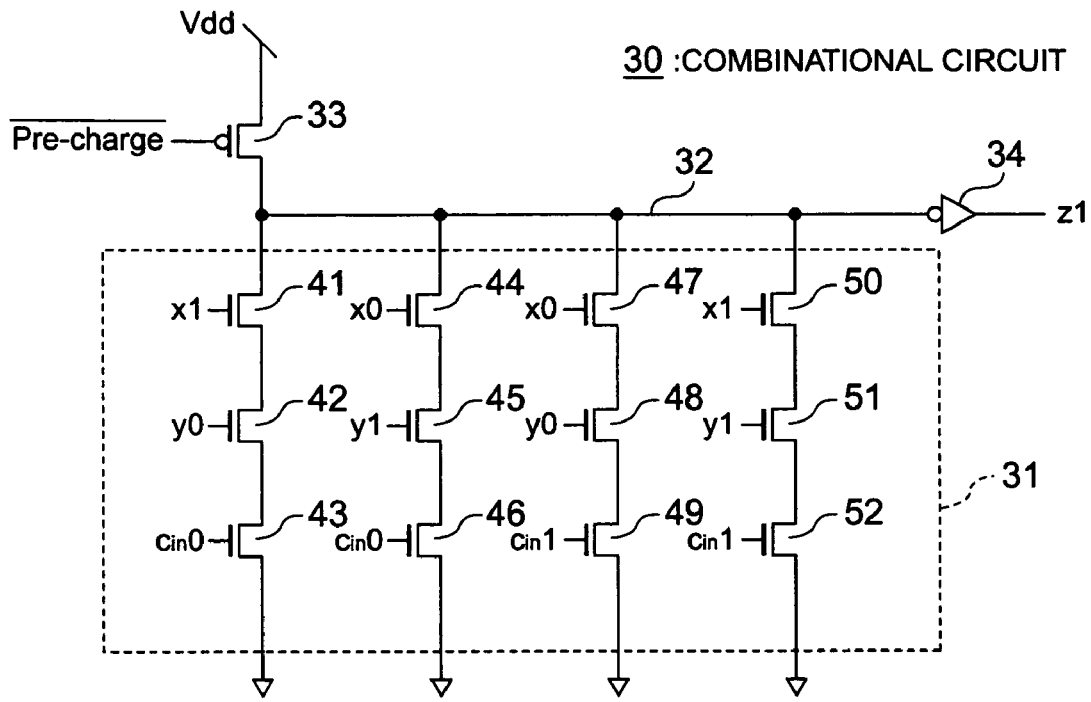
FIG. 4 is a schematic of a combinational circuit of the first exemplary embodiment.
FIG. 5 is a truth table for input and output signals.

Here, the symbol $\oplus$ indicates exclusive OR. The asynchronous adder 10 includes a combinational circuit to perform full addition based on the dual-rail encoded input values X, Y and $C_{in}$, and output the dual-rail encoded sum Z and carry $C_{out}$. This combinational circuit is configured based on a truth table satisfying equations (1) and (2). FIG. 5 is a truth table obtained by equations (1) and (2) and showing all combinations between input and output.

FIG. 4 is a schematic showing one example of a combinational circuit 30 to compute z1. The combinational circuit 30 includes an N-ch MOSFET network 31 that has a plurality of columns of cascaded N-ch MOSFETs between a node 32 and the ground, a P-ch MOSFET 33 as a precharge device to precharge the node 32 when all input values X, Y and $C_{in}$ are "Null", and an inverter 34 that inverting-outputs the voltage of the node 32. The output value of the inverter 34 is z1. The N-ch MOSFET network 31 includes twelve N-ch MOSFETs 41 through 52 of three stages and four columns. The drain terminals of the N-ch MOSFETs 41, 44, 47 and 50 at the uppermost stages of all columns are connected to the node 32. The source terminals of the N-ch MOSFETs 43, 46, 49 and 52 at the lowermost stages are grounded. Each gate terminal of the N-ch MOSFETs 41 through 52 is connected to an input signal line (x1, x0, y1, y0, $c_{in}1$ and $c_{in}0$) based on the truth table for input and output signals. The number of columns in the N-ch MOSFET network 31 (four in this exemplary embodiment) is the same as the number of combinations of input values with which z1 is set to High (four in this exemplary embodiment). Combinational circuits to compute z0, $c_{out}1$ and $c_{out}0$ can also be configured based on the truth table (FIG. 5), similarly as above illustrated.

When all input values X, Y and $C_{in}$ are "Null", the above described precharge signal generator 40 switches the logic level of a precharge_signal to Low. Then, the P-ch MOSFET 33 is turned ON so as to precharge the node 32 to a logic level High with a power supply Vdd. At that time, the logic level of z1 is Low. When any of input values X, Y and $C_{in}$ takes "0" or "1", the logic level of a precharge_signal is High, turning the P-ch MOSFET 33 OFF. At that time, signals at a Low or High level corresponding to "0" or "1" are input to the gate terminals of the N-ch MOSFETs 41 through 52. If all cascaded N-ch MOSFETs of any column are turned ON, the logic level of the node 32 is switched from High to Low, and thus the logic level of z1 is switched from Low to High.

It is preferable that the P-ch MOSFET 33 is turned OFF prior to turning ON the N-ch MOSFETs 41 through 52 to discourage or avoid a current flowing through the power supply Vdd to the ground. In the N-ch MOSFET network 31, for convenience, twelve N-ch MOSFETs 41 through 52 are arranged in order to clearly show the correspondence between the arrangement of the N-ch MOSFETs 41 through 52 and the truth table (FIG. 5). If necessary, the connection relationship in the N-ch MOSFETs 41 through 52 may be enhanced or optimized to reduce the number of transistors. For example, the N-ch MOSFETs 43 and 46 can be replaced by a single N-ch MOSFET. Also, as is apparent from equation (2), when the input values X and Y are "1", the carry output $C_{out}$ is invariably "1" irrespective of the value of carry-in $C_{in}$. Therefore, a combinational circuit may be configured so that $c_{out}1$ is "1" irrespective of whether $c_{in}1$ is "1" or "0" when x1 and y1 are "1". In addition, the combinational circuit 30 may employ a P-ch MOSFET network made up of plural P-ch MOSFETs instead of the N-ch MOSFET network 31.

Figure 8:
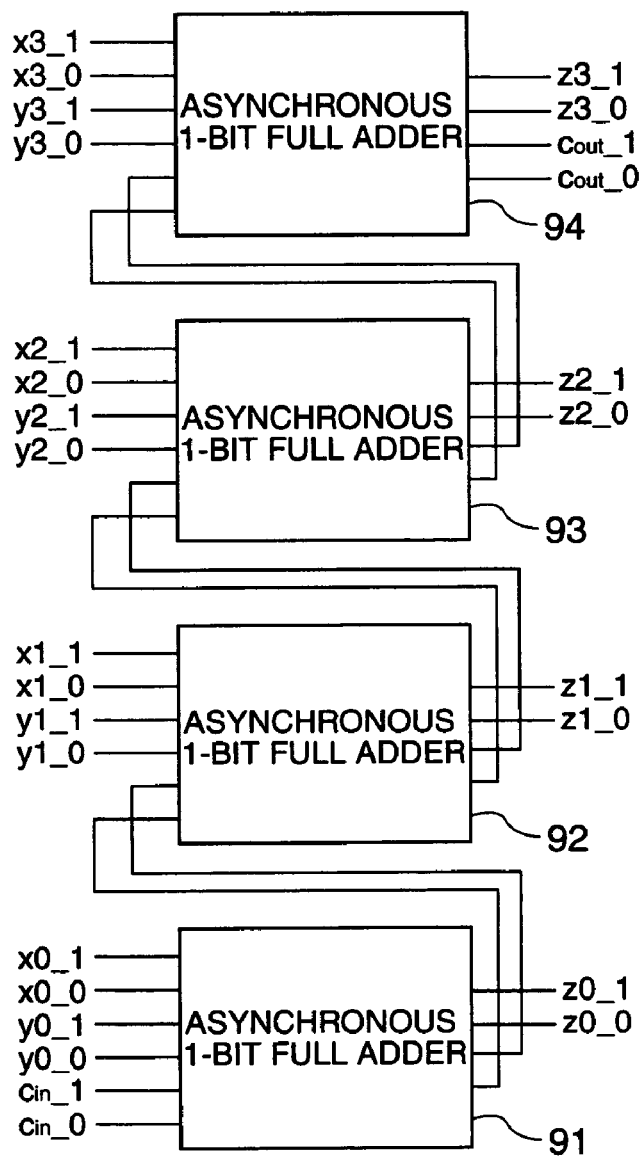
FIG. 8 is a schematic of a 4-bit full adder.

FIG. 8 is a schematic of a 4-bit asynchronous full adder 90. The asynchronous adder 90 includes four 1-bit full adders 91 through 94. The carry from a lower-order bit is fed to the carry-in of the upper-order bit. Here, the two 4-bit addends, 4-bit sum, 1-bit carry-in and 1-bit carry are represented as X[3:0], Y[3:0], Z[3:0], $C_{in}$ and $C_{out}$, respectively. These input and output signals are all dual-rail encoded so as to be converted as follows: X3={x3_1, x3_0}, X2={x2_1, x2_0}, X1={x1_1, x1_0}, X0={x0_1, x0_0}, Y3={y3_1, y3_0}, Y2={y2_1, y2_0}, Y1={y1_1, y1_0}, Y0={y0_1, y0_0}, $C_{in}$={c in_1, c in_0} and $C_{out}$={c out_1, c out_0}.

Figure 9:
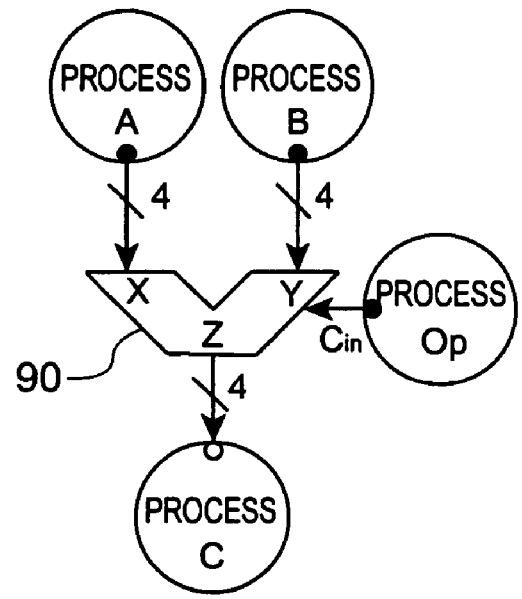
FIG. 9 is a schematic of four-phase handshaking.

FIG. 9 is a schematic of a four-phase handshaking in the asynchronous adder 90. The asynchronous adder 90 is connected to each of processes A, B, C and Op through a 4-bit channel, as shown in the drawing. The process A has an active output port. The process A outputs a 4-bit addend X to the asynchronous adder 90 and waits for an acknowledge signal from the process C. Similarly, the process B has an active output port. The process B outputs another 4-bit addend Y to the asynchronous adder 90 and waits for an acknowledge signal from the process C. The process Op controls whether the asynchronous adder 90 performs addition or subtraction, and so forth. The process Op communicates with the process B so as to have an effect on the output value from the process B. If the asynchronous adder 90 performs addition, the process Op inputs "0"={0, 1} as the carry-in $C_{in}$ to the asynchronous adder 90 and waits for an acknowledge signal from the process C. Meanwhile, if the asynchronous adder 90 performs subtraction, the process Op inputs "1"={1, 0} as the carry-in $C_{in}$ to the asynchronous adder 90 and waits for an acknowledge signal from the process C. The subtracted value is logically inverted simply by an inverter (not shown) or the like. Subtraction can be performed by adding the 2's complement as above. It is not necessary that the request signals from the processes A, B and Op are simultaneously fed to the asynchronous adder 90. The process C has a passive input port to receive an output from the asynchronous adder 90. Upon the receiving the sum Z from the asynchronous adder 90, the process C outputs acknowledge signals to the processes A, B and Op.

Figure 10:
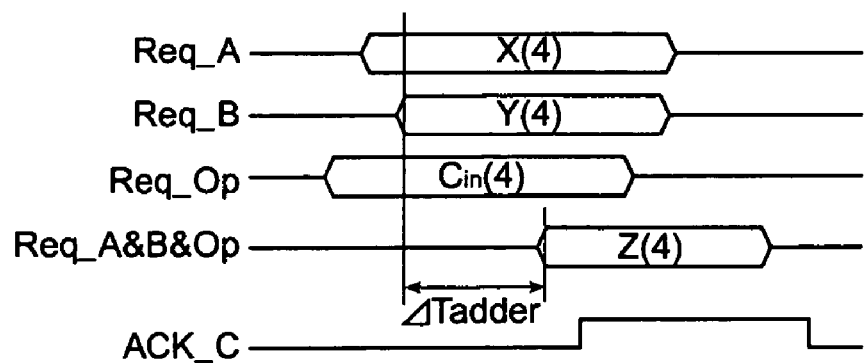
FIG. 10 is a schematic of four-phase handshaking.

FIG. 10 is a schematic showing handshaking among the processes. The symbol $\Delta T_{adder}$ indicates the delay of the asynchronous adder 90. In this example, the process Op first outputs the 1-bit carry-in $C_{in}$. Subsequently, the addends X and Y are output from the process A and B respectively. The asynchronous adder 90 outputs the sum Z to the process C when the time of $\Delta T_{adder}$ elapses after the asynchronous adder 90 has received all of the addends X, Y and carry-in $C_{in}$. The sum Z is input to the process C as one request, i.e., Req_A&B&Op, obtained by merging three request signals from the processes A, B and Op (X as Req_A, Y as Req_B and $C_{in}$ as Req_Op). The process C outputs an acknowledge signal in response to the request. That is, the process C switches Ack_C to High. The acknowledge signal is input to the processes A, B and Op. Each of the processes A, B and Op receives the acknowledge signal and negates the respective request signal, i.e., outputs "Null". When "Null" is input to X, Y and $C_{in}$, the asynchronous adder 90 outputs "Null" to the sum output Z after a certain computation delay. The process C switches the acknowledge signal to Low, responding to that the sum output Z as Req_A&B&Op is "Null".

An asynchronous adder of the present exemplary embodiment may be imported easily and surely by "cut open" of channels between processes. "Cut open" may take place after logic synthesis of the control part, which is temporarily separated from and afterward connected with the data part.

Second Exemplary Embodiment

Figure 11:
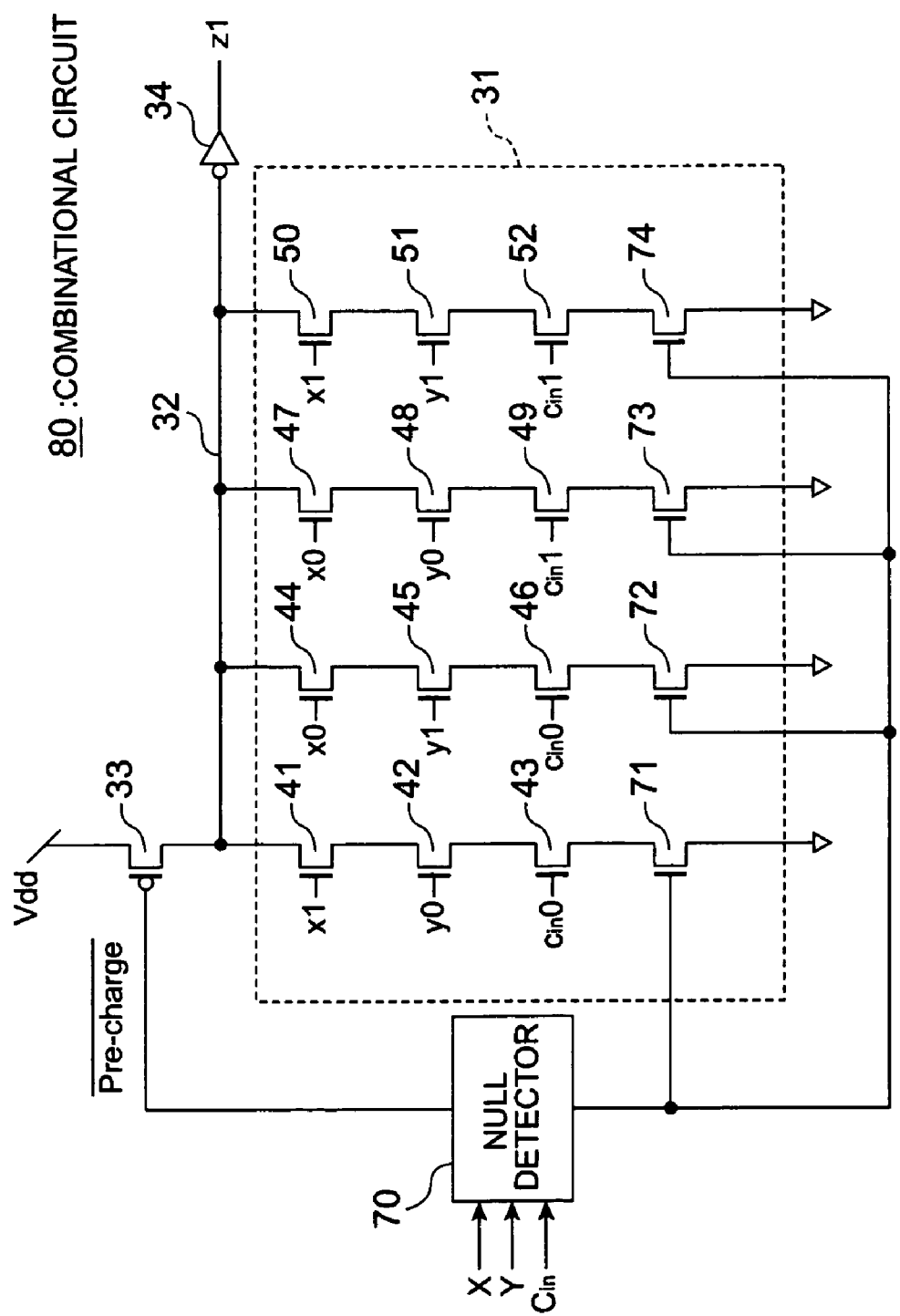
FIG. 11 is a schematic of a combinational circuit of a second exemplary embodiment.

FIG. 11 is a schematic showing a configuration example of a combinational circuit 80, which is another example of a combinational circuit, to perform computing z1. The same numerals as those in FIG. 4 indicate the same elements and so forth, and detailed description for the elements will be omitted. The combinational circuit 80 further includes, in addition to the configuration of the above combinational circuit 30, a Null detector 70 for detecting Null of an input signal and N-ch MOSFETs 71 through 74 to time the N-ch MOSFET network 31 to be turned ON. The Null detector 70 detects Null of the input signal so as to make the precharge_signal low to turn ON the P-ch MOSFET 33. If an input signal takes a value other than Null ("0" or "1"), when sufficient time elapses after the P-ch MOSFET 33 has been turned OFF, the Null detector 70 feeds control signals to gate terminals of the N-ch MOSFETs 71 through 74 so as to turn ON the N-ch MOSFETs 71 through 74. As described above, timing the N-ch MOSFETs 71 through 74 to turn ON can discourage or prevent a wasteful current that flows from the power supply Vdd to the ground when the P-ch MOSFET 33 and the N-ch MOSFET network 31 are simultaneously turned ON.

Third Exemplary Embodiment

Figure 12:
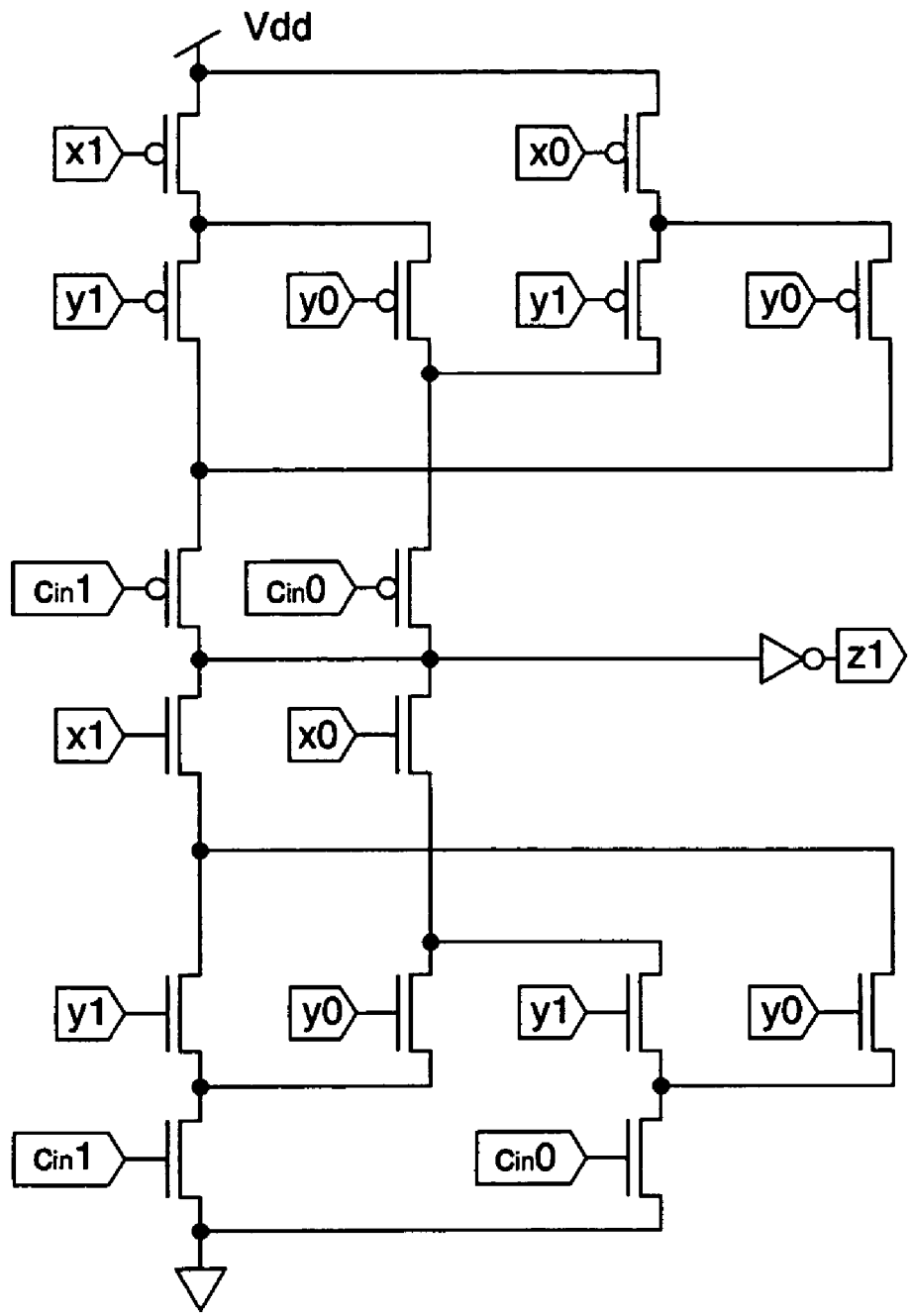
FIG. 12 is a schematic of a combinational circuit of a third exemplary embodiment.

FIG. 12 is a schematic showing the configuration of a combinational circuit 100 of the present exemplary embodiment. FIG. 12 shows an example in which CMOS logic circuits constitute a combinational circuit to generate z_1 output of the dual-rail encoded sum Z. The combinational circuit 100 is configured so that the input/output relationship of the asynchronous adder 10 satisfies equations (1) and (2). The combinational circuit for full addition is made up of CMOS logic, which is preferably arranged to reduce or suppress glitches caused by input transitions, even without a Null detection circuit. Since glitches cause incorrect operation of circuits, it is necessary to suppress glitches. Although combinational circuits to generate $z\_0$, $c\_out\_1$ and $c\_out\_0$ outputs are not illustrated in the drawing, these combinational circuits can be obtained with CMOS logic circuits similarly to the combinational circuit for $z\_1$ output.

Fourth Exemplary Embodiment

An asynchronous microprocessor of the present exemplary embodiment includes any of the asynchronous adders disclosed in the first through third exemplary embodiments. An asynchronous microprocessor is a microprocessor in which optimally grained functional circuits (processes) locally cooperate with each other actively or passively to perform distributed processing without using global clock. In a synchronous microprocessor designed to operate based on global clock for central control in a system, various operations such as "instruction fetch", "decode", "execute" and "write back" are performed in sync with global clock, and therefore clock delay, clock skew, clock jitter and so forth become problematic in enhancing the speed of circuit operation. In contrast, an asynchronous microprocessor does not involve such problems since optimally grained and self-timed functional circuits communicate by handshaking and cooperate with each other actively or passively in an event-driven fashion.

In an asynchronous microprocessor, optimally grained functional circuits are driven by events to operate only when either active or passive operation is determined in semantics to take place. In other words, each optimally grained functional circuit can operate in parallel independently of other functional circuits, and need not wait for the completion of operations by the other functional circuits. Once the condition for a functional circuits is satisfied to go, it remains on standby for quick service. All the processes are blocking under the condition.

Fifth Exemplary Embodiment

An electronic apparatus of the present exemplary embodiment includes the asynchronous microprocessor of the fourth exemplary embodiment. The term electronic apparatus refers to typical equipment having a circuit board and other elements, and exerts a certain function. The structure thereof is not limited particularly. Examples of such an electronic apparatus includes a battery-driven portable apparatus, a sheet computer, an electronic paper, a wearable computer, an IC card, a smart card, a cellular phone, a video camera, a personal computer, a head mounted display, a projector of rear or front type, a wearable health management apparatus, a wearable toy, a pervasive wireless sensor, radio frequency identification (RFID), an attached thermometer, a facsimile device with a display function, a portable TV, a personal digital assistant (PDA), an electronic notebook, a sheet calculator, an electronic signboard, an advertisement display, a wireless tag with a display function, a system on panel (SOP) and a system on glass (SOG), for example.

What is claimed is:

1. An asynchronous full adder, comprising:
a set of combinational circuits that performs full addition with two addends and a carry-in that are dual-rail encoded, and to output a sum and a carry-out that are dual-rail encoded, each combinational circuit in the set including a plurality of columns of cascaded N-channel transistors between a node and ground, the combinational circuit performing full addition to generate an output, the output being one of the sum and the carry-out, the cascaded N-channel transistors being N-channel metal-oxide-semiconductor field-effect transistors (N-ch MOSFETs), each combinational circuit including:
a detection device to detect input values;
a precharge device to precharge the node if the detection device detects Null of an input value;
a connecting device to connect input signals to gate terminals of the N-ch MOSFETs based on a truth table which specifies a combinational logic required to compute an output signal from input signals;
a buffer to drive the node to a voltage of the output value; and
the drain terminals of the N-ch MOSFETs at uppermost stages of all columns being connected to the node, and source terminals of the N-ch MOSFETs at lowermost stages of all columns being connected to the ground.

2. The asynchronous full adder according to claim 1, wherein the a detection device detects input values being all Null and, each combinational circuit performs full addition only when input values other than Null are applied.

3. The asynchronous full adder according to claim 1, further comprising a device to, if input values other than Null are input, control so that the precharge device does not precharge the node during a period when all N-ch MOSFETs of any column of the N-ch MOSFET network are ON.

4. The asynchronous full adder according to claim 1, further comprising dual-rail decoders that decode dual-rail encoded input values.

5. An asynchronous microprocessor, comprising: the asynchronous full adder according to claim 1.

6. An electronic apparatus, comprising: the asynchronous microprocessor according to claim 5.

* * * * *